United States Patent
Park et al.

(10) Patent No.: US 8,806,257 B2
(45) Date of Patent: Aug. 12, 2014

(54) IMAGE PROCESSING APPARATUS AND CONTROL METHOD THEREOF

(75) Inventors: Soo Hee Park, Suwon-si (KR); Yoon Tae Lee, Seoul (KR)

(73) Assignee: SAMSUNG Electronics Co., Ltd., Suwon-si (KR)

(*) Notice: Subject to any disclaimer, the term of this patent is extended or adjusted under 35 U.S.C. 154(b) by 872 days.

(21) Appl. No.: 12/104,499

(22) Filed: Apr. 17, 2008

(65) Prior Publication Data

US 2009/0044037 A1 Feb. 12, 2009

(30) Foreign Application Priority Data

Aug. 7, 2007 (KR) .................... 10-2007-078862

(51) Int. Cl.
*G06F 1/12* (2006.01)

(52) U.S. Cl.
USPC ................... 713/400; 713/501; 713/600

(58) Field of Classification Search
USPC .......................... 713/400, 501, 600
See application file for complete search history.

(56) References Cited

U.S. PATENT DOCUMENTS

| | | | | |
|---|---|---|---|---|
| 6,128,094 A * | 10/2000 | Smith | ............ | 358/1.15 |
| 6,148,215 A * | 11/2000 | Doi et al. | ............ | 455/552.1 |
| 6,185,692 B1 * | 2/2001 | Wolford | ............ | 713/501 |
| 6,496,888 B1 * | 12/2002 | Pole, II | ............ | 710/110 |
| 6,643,240 B2 * | 11/2003 | Chen | ............ | 369/53.3 |
| 6,788,156 B2 * | 9/2004 | Tam et al. | ............ | 331/49 |
| 6,867,631 B1 * | 3/2005 | Athas et al. | ............ | 327/291 |
| 7,290,155 B2 * | 10/2007 | George et al. | ............ | 713/322 |
| 7,551,383 B1 * | 6/2009 | Kupferman | ............ | 360/67 |
| 2004/0100657 A1 * | 5/2004 | Lee | ............ | 358/1.16 |
| 2005/0111025 A1 * | 5/2005 | Kim | ............ | 358/1.13 |
| 2005/0120144 A1 * | 6/2005 | Koyama | ............ | 710/8 |
| 2005/0165977 A1 * | 7/2005 | Morawski | ............ | 710/15 |
| 2005/0184773 A1 * | 8/2005 | Boyko et al. | ............ | 327/156 |
| 2006/0044597 A1 * | 3/2006 | Dumitrescu et al. | ............ | 358/1.15 |
| 2006/0085660 A1 * | 4/2006 | Zagacki | ............ | 713/322 |
| 2007/0255967 A1 * | 11/2007 | Jun | ............ | 713/300 |
| 2008/0034237 A1 * | 2/2008 | Padwekar et al. | ............ | 713/322 |

FOREIGN PATENT DOCUMENTS

| | | |
|---|---|---|
| JP | 2006-099643 | 4/2006 |
| JP | 2006099643 | 4/2006 |

* cited by examiner

*Primary Examiner* — Nimesh G Patel
(74) *Attorney, Agent, or Firm* — Stanzione & Kim, LLP

(57) ABSTRACT

Disclosed is an image processing apparatus, which can differently set a clock ratio according to a use rate of a CPU, and a control method thereof. The image processing apparatus may include a receiver to receive a print command from a user terminal, and a controller to differently set a clock ratio according to a use rate of the CPU based on the print command.

24 Claims, 3 Drawing Sheets

IMAGE PROCESSING APPARATUS AND CONTROL METHOD THEREOF

CROSS-REFERENCE TO RELATED APPLICATIONS

This application claims the benefit and priority under 35 U.S.C. §119(a) of Korean Patent Application No. 10-2007-0078862, filed on Aug. 7, 2007, in the Korean Intellectual Property Office, the disclosure of which is incorporated herein by reference in its entirety.

BACKGROUND OF THE INVENTION

1. Field of the Invention

The present general inventive concept relates to an image processing apparatus. More particularly, the present general inventive concept relates to an image processing apparatus capable of differently setting a clock ratio according to a use rate of a CPU (central processing unit), and a control method thereof.

2. Description of the Related Art

In general, an image processing apparatus includes a printer, a facsimile, a multi-function peripheral, and a duplicator and has a function of printing a document or an image. Such an image processing apparatus includes a printing engine that prints a document or an image on a recording medium, a CPU that controls the printing engine, and a system bus that transmits results processed by the CPU to the printing engine or other peripheral devices.

In order to improve the performance of an image processing apparatus, the performance of a CPU must be enhanced. In order to improve the performance of the CPU, the process speed of the CPU must be increased by increasing an operation speed (hereinafter, referred to as the CPU clock frequency).

However, as the CPU clock frequency is increased, other peripheral devices may not keep pace with the high CPU clock frequency and thus a system may not normally operate. If the CPU clock frequency is too high in a micro circuit, various types of radio noises may be generated in a circuit board and other peripheral devices may be subject to such radio noises. Accordingly, a clock ratio has been used in order to keep pace with a high clock frequency, such as the CPU clock frequency, and a low clock frequency such as a bus clock frequency.

A clock ratio denotes a ratio of a CPU clock frequency to a bus clock frequency. When a conventional image processing apparatus using such a clock ratio is powered on, the image processing apparatus operates by using a predetermined CPU clock frequency and a predetermined bus clock frequency.

When a document or an image is printed using the conventional image processing apparatus, the printing operation may be subject to a CPU clock frequency or a bus clock frequency according to the type and characteristics of emulation (that is, a printer control program) in accordance with a print command transmitted from a printer driver. For example, when software processing is performed by a CPU core, increasing the CPU clock frequency is advantageous for improving the printing performance. When a rendering operation is performed by emulation using many hardware accelerators, increasing the bus clock frequency is advantageous for improving the printing performance.

However, since the conventional image processing apparatus operates by using a predetermined CPU clock frequency and a predetermined bus clock frequency without considering the type and characteristics of emulation, the energy efficiency may be degraded and the performance of the conventional image processing apparatus may deteriorate.

Thus, the conventional image processing apparatus may not be efficiently operated.

SUMMARY OF THE INVENTION

The present general inventive concept provides an image processing apparatus capable of differently setting a clock ratio according to a use rate of a CPU of the image processing apparatus, and a control method thereof.

Additional aspects and utilities of the present general inventive concept will be set forth in part in the description which follows and, in part, will be obvious from the description, or may be learned by practice of the general inventive concept.

The foregoing and/or other aspects and utilities of the present general inventive concept may be achieved by providing an image processing apparatus including a receiver to receive a print command from a user terminal, and a controller to differently set a clock ratio according to a use rate of a CPU of the image processing apparatus based on the print command.

The controller may set the clock ratio higher than a reference ratio when the use rate of the CPU is higher than a reference rate, and may set the clock ratio lower than a reference ratio when the use rate of the CPU is not higher than a reference rate.

The controller may generate a clock frequency of the CPU corresponding to the set clock ratio.

The controller may include a determination unit to determine the use rate of the CPU, and a setting unit to differently set the clock ratio according to the use rate of the CPU.

The print command may include a PJL (printer job language) command.

The determination unit may determine the use rate of the CPU by detecting a type of emulation provided in a header of the print command, may determine that the use rate of the CPU is lower than a reference rate when the emulation is GDI (graphics device interface) emulation, and may determine that the use rate of the CPU is higher than a reference rate when the emulation is PDL (printer description language) emulation.

The image processing apparatus may further include a storage unit to store the use rate of the CPU according to the type of the emulation.

The determination unit may detect the type of the emulation, and may compare the detected emulation to information stored in the storage unit to determine the use rate of the CPU.

The foregoing and/or other aspects and utilities of the present general inventive concept may also be achieved by providing a method to control an image processing apparatus, the method including receiving a print command, and differently setting a clock ratio according to a use rate of a CPU based on the received print command.

When the use rate of the CPU is higher than a reference rate, the clock ratio may be set higher than a reference ratio. When the use rate of the CPU is not higher than a reference rate, the clock ratio may be set lower than a reference ratio.

After the clock ratio is set, a clock frequency of the CPU may be generated corresponding to the set clock ratio.

The use rate of the CPU may be determined by detecting a type of emulation provided in a header of the print command. When the emulation is GDI emulation, it may be determined that the use rate of the CPU is lower than a reference rate. When emulation is PDL emulation, it may be determined that the use rate of the CPU is higher than a reference rate.

After the print command is received, the type of the emulation may be detected, and the detected emulation may be compared to previously stored information to determine the use rate of the CPU.

The foregoing and/or other aspects and utilities of the present general inventive concept may also be achieved by providing clock setting system used to set a CPU clock of an image processing apparatus including a CPU, and a controller to provide a clock to the CPU according to a type of printer emulation used by a host computer connected to the image processing apparatus.

The type of printer emulation used by the host computer may be provided in a print command from the host computer to the image processing apparatus.

The controller may provide a first clock to the CPU and a second clock to a system bus of the image processing apparatus according to the type of printer emulation used by the host computer.

The foregoing and/or other aspects and utilities of the present general inventive concept may also be achieved by providing a method controlling a CPU of an image processing apparatus, the method including determining a first clock rate to operate the CPU according to a printer emulation type of a host computer connected to the image processing apparatus, and generating a first clock having the first clock rate and providing the first clock to the CPU.

The method may further include determining a second clock rate to operate a system bus of the image processing apparatus according to the printer emulation type of the host computer.

The method may further include generating a second clock having the second clock rate and providing the second clock to the system bus.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
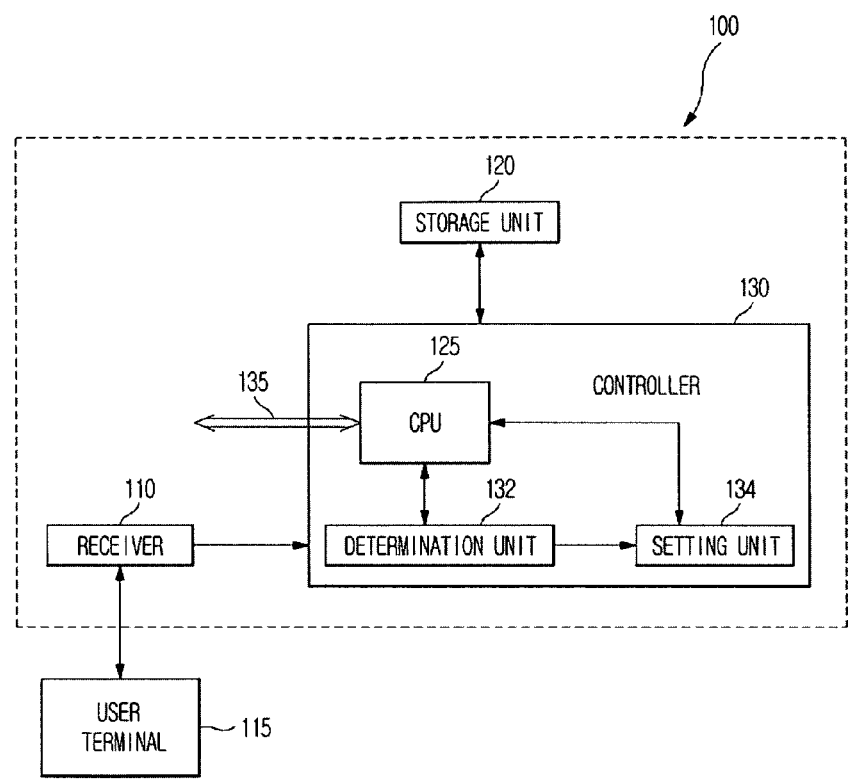
FIG. 1 is a block diagram of an image processing apparatus according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

As illustrated in FIG. 1, the image processing apparatus 100 according to an embodiment of the present general inventive concept includes a receiver 110, a storage unit 120, a controller 130 and a system bus 135.

The receiver 110 receives a print command from a user terminal 115, which may be a PC, or other host computer. Preferably, such a print command includes a PJL (printer job language) command.

In more detail, as a command to print an image is input to a host computer from a user, where the host computer may be, for example the PC of the user terminal 115, a printer driver in the host computer generates a PJL print command and transmits the PJL print command to the receiver 110 of the image processing apparatus 100.

The storage unit 120 may include a non-volatile memory, such as a ROM (read only memory) to store various control programs necessary to perform functions of the image processing apparatus 100, and a volatile memory such as a DRAM (dynamic random access memory) to store a use rate of a CPU 125 of the controller 130 of the image processing apparatus 100 according to a type of emulation being used. The emulation denotes a printer control program as printer control logic.

The controller 130 may include a determination unit 132 to determine the use rate of a CPU 125 by using information provided in the print command, and a setting unit 134 to differently set a clock ratio according to the use rate of the CPU 125.

In more detail, the determination unit 132 determines the use rate of the CPU 125 by detecting information regarding the type of the emulation being used which information is provided in a header of the input print command from the user terminal 115. That is, when the print command originating from the user terminal 115 is received by the determination unit 132 via the receiver 110, the determination unit 132 determines the use rate of the CPU 125 by detecting the type of the emulation from information provided in the header of the print command through parsing of the print command.

For example, when the emulation detected by the determination unit 132 in a host computer, such as, for example, the user terminal 115, is GDI (graphics device interface) emulation, the determination unit 132 determines the user rate of the CPU 125. Since GDI emulation in the host computer performs most printer operations, except for physical printing, by using software, the image processing apparatus 100 mainly performs the actual printing of printed matters. Accordingly, it is determined by the determination unit 132 that the use rate of the CPU 125 is lower than a predetermined reference rate, and the performance of the image processing apparatus 100 can be improved by increasing the clock frequency of the system bus 135 instead of the clock frequency of the CPU 125. Thus, in this example, the setting unit 134 sets a clock ratio such that the clock frequency of the CPU 125 is not increased, but the clock frequency of the system bus 135 is increased.

As described above, the predetermined reference rate denotes a rate used to determine the use rate of the CPU 125. If the use rate of the CPU 125 is lower than the predetermined reference rate, the performance of the image processing apparatus 100 can be improved by increasing the clock frequency of the system bus 135 instead of the clock frequency of the CPU 125. In addition, if the use rate of the CPU 125 is higher than the predetermined reference rate, the performance of the image processing apparatus 100 can be improved by increasing the clock frequency of the CPU 125 instead of the clock frequency of the system bus 135. Such a predetermined reference rate may have various values according to the structure and characteristics of the image processing apparatus 100 or the type of the CPU 125.

Further, when the emulation detected by the determination unit 132 is PDL (printer description language) emulation, if a print command is input from the host computer of the user terminal 115, the PDL emulation analyzes a printed matter in the image processing apparatus 100, generates a printing image by converting the analyzed data into bitmap data, and then prints the printing image. Thus, the PDL emulation performs many complicated operations by using software in the CPU 125. In such a case, since the performance of the CPU 125 is important, the use rate of the CPU 125 is higher than the predetermined reference rate.

In addition, the determination unit 132 detects the type of the emulation, and compares the detected emulation with information stored in the storage unit 120 to determine the use rate of the CPU 125.

That is, since the storage unit 120 stores the use rate of the CPU 125 previously set by the setting unit 134 according to the type of the emulation, the determination unit 132 can detect the type of emulation provided in the header of the print command, and can easily determine the use rate of the CPU 125 by using the detected emulation.

In general, the setting unit 134 differently sets the clock ratio according to the determined use rate of the CPU 125. When the use rate of the CPU 125 is higher than a predetermined reference rate, the setting unit 134 sets the clock ratio higher than a predetermined reference ratio. However, when the use rate of the CPU 125 is lower than the predetermined reference rate, the setting unit 134 sets the clock ratio lower than the predetermined reference ratio.

The reference ratio is a ratio used to set the clock ratio and denotes a predetermined preset ratio.

For example, in a case in which the reference ratio has a value of 3.5, a reference CPU clock frequency corresponding to the reference ratio is 385 MHz, and a reference system bus frequency is 110 MHz. When the use rate of the CPU 125 is higher than the predetermined reference rate, the setting unit 134 sets the clock ratio to 4. However, when the use rate of the CPU 125 is lower than the predetermined reference rate, the setting unit 134 sets the clock ratio to 3.

Further, the setting unit 134 generates the clock frequency of the CPU 125 corresponding to the set clock ratio.

An additional description will be given based on the example as described above, after the setting unit 134 sets the clock ratio to 4, the setting unit 134 generates the clock frequency of the CPU 125 having a frequency of 400 MHz corresponding to the clock ratio set to 4. Then, the clock frequency of the system bus 135 having a frequency of 100 MHz is generated in response to the generated clock frequency of the CPU 125. As a result, when the use rate of the CPU 125 is higher than the predetermined reference rate, the clock frequency of 400 MHz of the CPU 125 is higher than a reference clock frequency of 385 MHz. However, the clock frequency of 100 MHz of the system bus 135 is lower than a reference bus frequency of 110 MHz.

Figure 2:
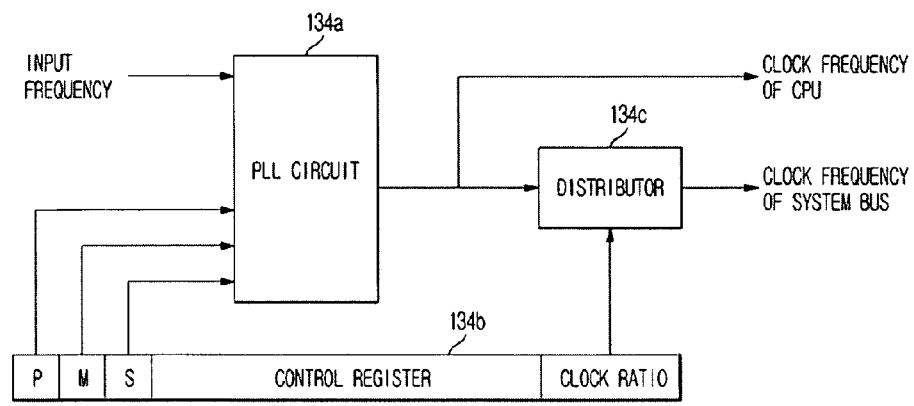
FIG. 2 is a block diagram schematically illustrating an embodiment of the setting unit of FIG. 1.

Hereinafter, a process in which the setting unit 134 generates the clock frequency of the CPU 125 will be described with reference to FIG. 2.

The setting unit 134 may include a PLL (phase looked loop) circuit 134a, a control register 134b and a distributor 134c. When an input frequency is input to the PLL circuit 134a, the control register 134b varies an input value, for example a PMS value, and outputs the varied input value to the PLL circuit 134a such that the clock frequency of the CPU 125 can be generated corresponding to the clock ratio. The PLL circuit 134a generates the clock frequency of the CPU 125 by using the input frequency and the input value, and generates the clock frequency of the system bus 135 by using the clock ratio input from the control register 134b and the distributor 134c.

For example, when an input frequency of 10 MHz is input to the PLL circuit 134a, the control register 134b outputs an input value, which may be a PMS value (for example, P=10, M=8, S=½) to the PLL circuit 134a to generate the clock frequency of the CPU 125 corresponding to the clock ratio set to 4. Accordingly, the clock frequency of the CPU 125 having a frequency of 400 MHz [where 10*10(P)=100, 100*8(M) =800, and 800*½(S)=400] is generated according to the input value and the operation of the PLL circuit 134a. Then, the clock frequency of the system bus 135 having a frequency of 200 MHz [where 800/4(clock ratio)] is generated by the distributor 134c to the system bus 135.

Hereinafter, a control process of the image processing apparatus 100 will be described.

Figure 3:
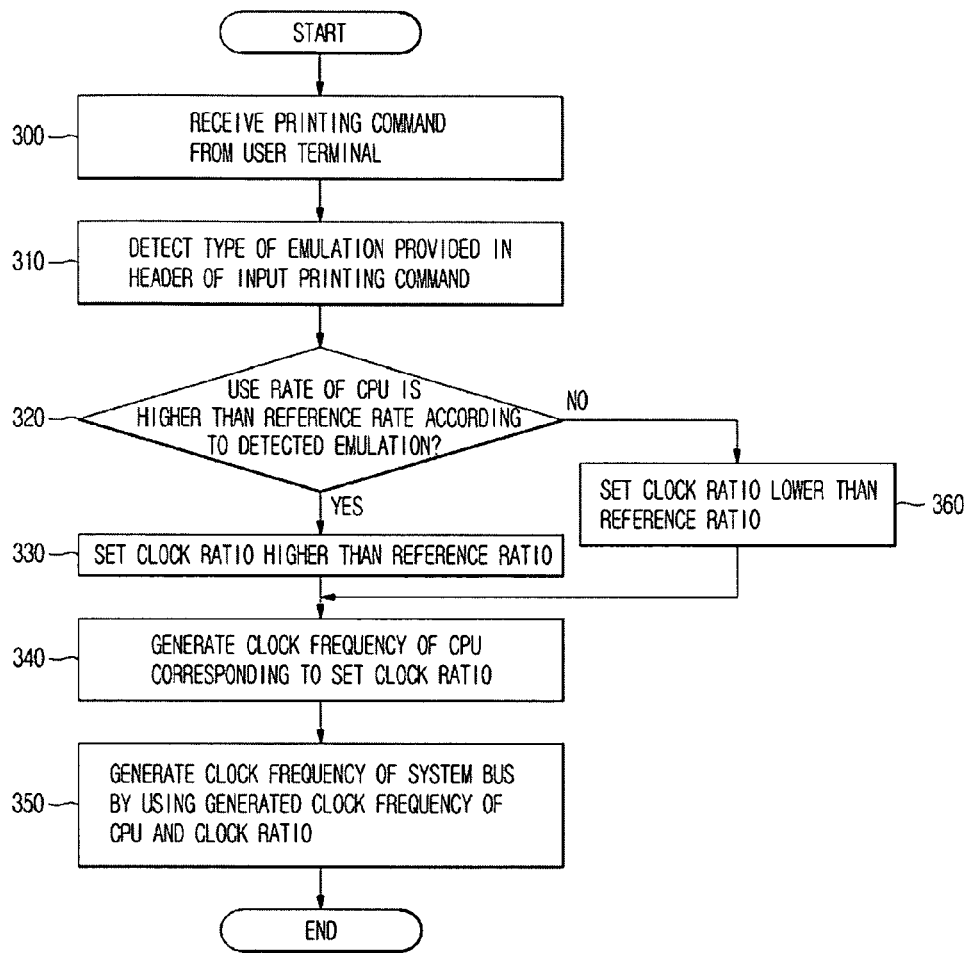
FIG. 3 is a flow diagram illustrating the control process of an image processing apparatus according to an embodiment of the present general inventive concept.

FIG. 3 is a flow diagram illustrating the control process of the image processing apparatus 100 according to an embodiment of the present general inventive concept. As illustrated in FIG. 3, the receiver 110 receives a print command from a user terminal (operation 300).

The determination unit 132 detects the type of emulation provided in the header of the input print command (operation 310).

Next, the determination unit 132 determines if the use rate of the CPU 125 is higher than the predetermined reference rate according to the detected emulation (operation 320). When the use rate of the CPU 125 is higher than the predetermined reference rate, the setting unit 134 sets the clock ratio higher than the predetermined reference ratio (operation 330).

Then, the setting unit 134 generates the clock frequency of the CPU 125 corresponding to the set clock ratio (operation 340), and generates the clock frequency of the system bus 135 by using the generated clock frequency of the CPU and the clock ratio (operation 350).

When the use rate of the CPU is not higher than the predetermined reference rate in operation 320, the setting unit 134 sets the clock ratio lower than the predetermined reference ratio (operation 360) and generates the clock frequency of the CPU 125 corresponding to the set clock ratio (operation 340).

Thereafter, the setting unit 134 generates the clock frequency of the system bus 135 by using the generated clock frequency of the CPU 125 and the clock ratio (operation 350).

According to the image processing apparatus and the control method thereof of the present general inventive concept as described above, a clock ratio is differently set according to the type of emulation and the operation frequency of a CPU of the image processing apparatus and the operation frequency of a system bus are properly varied, so that the energy efficiency of the image processing apparatus can be improved.

Further, the image processing apparatus is efficiently operated, so that the performance of the image processing apparatus can be improved.

Although few embodiments of the present general inventive concept have been illustrated and described, it would be appreciated by those skilled in the art that changes may be made in these embodiments without departing from the principles and spirit of the general inventive concept, the scope of which is defined in the appended claims and their equivalents.

What is claimed is:

1. An image processing apparatus, comprising:
a receiver to receive a print command from a user terminal;
a determination unit that detects a type of emulation based on the print command and determines a use rate of a CPU of the image processing apparatus based on the type of emulation; and
a controller to differently set a clock ratio by setting a CPU clock frequency and a bus clock frequency according to the use rate of the CPU of the image processing apparatus determined according to the detected type of emulation, wherein the clock ratio denotes a ratio of the CPU clock frequency to the bus clock frequency, and wherein the controller sets the clock ratio higher than a reference ratio when the use rate of the CPU is higher than a reference rate, sets the clock ratio lower than the reference ratio when the use rate of the CPU is not higher than the reference rate, and generates the CPU clock frequency and the bus clock frequency corresponding to the set clock ratio.

2. The image processing apparatus of claim 1, wherein the controller sets the clock ratio higher than a reference ratio when the use rate of the CPU is higher than a reference rate.

3. The image processing apparatus of claim 1, wherein controller sets the clock ratio lower than a reference ratio when the use rate of the CPU is not higher than a reference rate.

4. The image processing apparatus of claim 1, wherein the controller generates a clock frequency of the CPU corresponding to the set clock ratio.

5. The image processing apparatus of claim 1, wherein the controller comprises
a setting unit to differently set the clock ratio according to the use rate of the CPU.

6. The image processing apparatus of claim 1, wherein the print command comprises a PJL (printer job language) command.

7. The image processing apparatus of claim 5, wherein the determination unit determines the use rate of the CPU by detecting a type of emulation provided in a header of the print command.

8. The image processing apparatus of claim 7, wherein the determination unit determines that the use rate of the CPU is lower than a reference rate when the emulation is GDI (graphics device interface) emulation.

9. The image processing apparatus of claim 7, wherein the determination unit determines that the use rate of the CPU is higher than a reference rate when the emulation is PDL (printer description language) emulation.

10. The image processing apparatus of claim 7, further comprising:
a storage unit to store the use rate of the CPU according to the type of the emulation.

11. The image processing apparatus of claim 10, wherein the determination unit detects the type of the emulation, and compares the detected emulation to information stored in the storage unit to determine the use rate of the CPU.

12. A method to control an image processing apparatus, the method comprising:
receiving a print command at the image forming apparatus;
detecting a type of emulation based on the print command;
determining a use rate of a CPU of the image processing apparatus based on the detected type of emulation; and
differently setting a clock ratio of the image processing apparatus by setting a CPU clock frequency and a bus clock frequency according to the use rate of the CPU of the image processing apparatus determined according to the detected type of emulation,
wherein the clock ratio denotes a ratio of the CPU clock frequency to the bus clock frequency, and
wherein when the use rate of the CPU is higher than a reference rate, the clock ratio is set higher than a reference ratio, when the use rate of the CPU is not higher than the reference rate, the clock ratio is set lower than the reference ratio, and after the clock ratio is set, a CPU clock frequency and the bus clock frequency are generated corresponding to the set clock ratio.

13. The method of claim 12, wherein, when the use rate of the CPU is higher than a reference rate, the clock ratio is set higher than a reference ratio.

14. The method of claim 12, wherein, when the use rate of the CPU is not higher than a reference rate, the clock ratio is set lower than a reference ratio.

15. The method of claim 12, wherein, after the clock ratio is set, a clock frequency of the CPU is generated corresponding to the set clock ratio.

16. The method of claim 12, wherein the use rate of the CPU is determined by detecting a type of emulation provided in a header of the print command.

17. The method of claim 16, wherein, when the emulation is GDI emulation, it is determined that the use rate of the CPU is lower than a reference rate.

18. The method of claim 16, wherein, when the emulation is PDL emulation, it is determined that the use rate of the CPU is higher than a reference rate.

19. The method of claim 12, wherein, after the print command is received, the type of the emulation is detected, and the detected emulation is compared to previously stored information to determine the use rate of the CPU.

20. A clock setting system used to set a CPU clock of an image processing apparatus, comprising:
a CPU to control the image forming apparatus; and
a controller to provide a clock to the CPU according to a type of printer emulation used by a host computer connected to the image processing apparatus, wherein the controller comprises:
a determination unit that detects the type of emulation based on a print command and determines a use rate of a CPU of the image processing apparatus based on the type of emulation; and
a setting unit in electrical communication with the CPU and the determination unit to differently set a clock ratio of the CPU by setting a CPU clock frequency and a bus clock frequency based on the determined use rate of the CPU of the image processing apparatus,
wherein the setting unit sets the clock ratio higher than a reference ratio when the use rate of the CPU is higher than a reference rate, sets the clock ratio lower than the reference ratio when the use rate of the CPU is not higher than the reference rate, and generates the CPU clock frequency and the bus clock frequency corresponding to the set clock ratio.

21. The clock setting system of claim 20, wherein the type of printer emulation used by the host computer is provided in a print command from the host computer to the image processing apparatus.

22. The clock setting system of claim 20, wherein the controller provides a first clock to the CPU and a second clock to a system bus of the image processing apparatus according to the type of printer emulation used by the host computer.

23. A method of controlling a CPU of an image processing apparatus, the method comprising:
detecting a printer emulation type of a host computer connected to the image processing apparatus based on a received printer command;
determining a use rate of the CPU of the image processing apparatus based on the type of emulation;
determining a first clock rate to operate the CPU according to the determined use rate; and
determining a second clock rate to operate a system bus of the image processing apparatus according to the determined use rate,
wherein when the use rate of the CPU is higher than a reference rate, a clock ratio is set higher than a reference ratio, when the use rate of the CPU is not higher than the reference rate, the clock ratio is set lower than the reference ratio, and after the clock ratio is set, the CPU clock frequency and the bus clock frequency are generated corresponding to the set clock ratio.

24. The method of claim 23, further comprising:
generating a second clock having the second clock rate and providing the second clock to the system bus.

* * * * *